Figure 1:
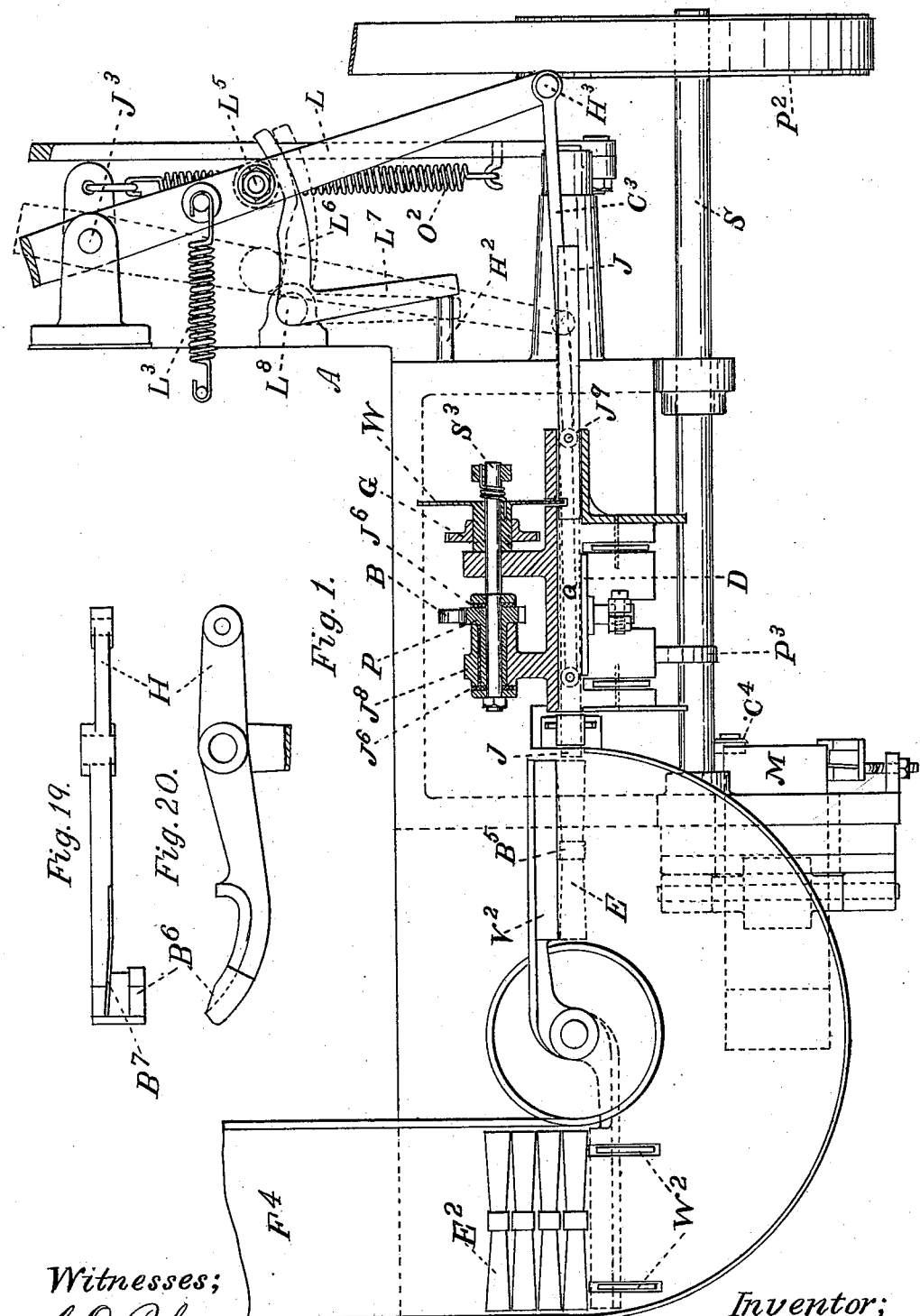

(No Model.) 8 Sheets—Sheet 1.
F. H. RICHARDS.
ENVELOPE COUNTING, PACKING, AND BANDING MACHINE.

No. 354,738. Patented Dec. 21, 1886.

Witnesses;
C. O. Palmer
H. F. Wrentt

Inventor;
Francis H. Richards (No Model.) 8 Sheets—Sheet 2.

F. H. RICHARDS.
ENVELOPE COUNTING, PACKING, AND BANDING MACHINE.

No. 354,738. Patented Dec. 21, 1886.

Inventor;
Francis H. Richards.

Witnesses;
C. O. Palmer.
H. F. Olcott (No Model.) 8 Sheets—Sheet 3.

F. H. RICHARDS.
ENVELOPE COUNTING, PACKING, AND BANDING MACHINE.

No. 354,738. Patented Dec. 21, 1886.

Witnesses:
H. F. Orcutt
C. O. Palmer

Inventor:
Francis H. Richards (No Model.)  F. H. RICHARDS.  8 Sheets—Sheet 4.
ENVELOPE COUNTING, PACKING, AND BANDING MACHINE.
No. 354,738.  Patented Dec. 21, 1886.

Witnesses;
H. F. L. Orcutt
C. O. Palmer

Inventor;
Francis H. Richards.

(No Model.) 8 Sheets—Sheet 5.

F. H. RICHARDS.
ENVELOPE COUNTING, PACKING, AND BANDING MACHINE.

No. 354,738. Patented Dec. 21, 1886.

Witnesses;
C. O. Palmer
H. F. L. Orcutt

Inventor;
Francis H. Richards (No Model.) 8 Sheets—Sheet 6.
F. H. RICHARDS.
ENVELOPE COUNTING, PACKING, AND BANDING MACHINE.
No. 354,738. Patented Dec. 21, 1886.
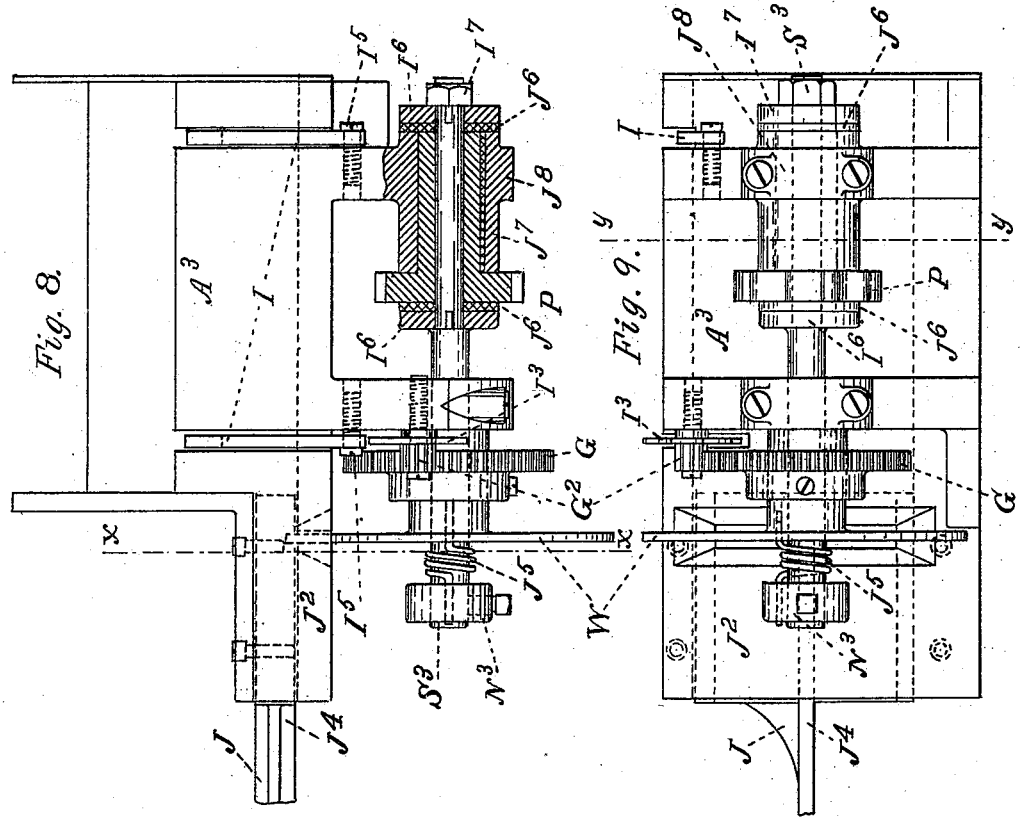
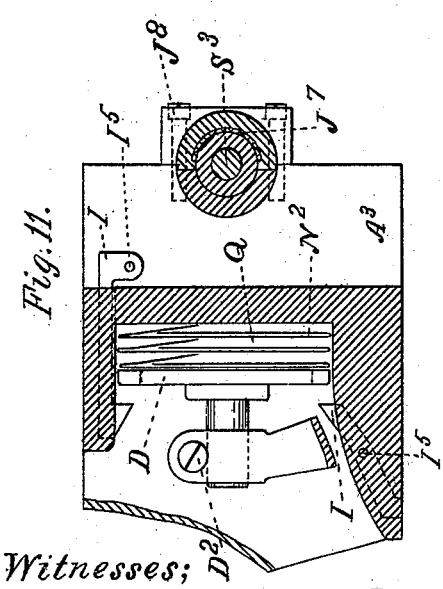
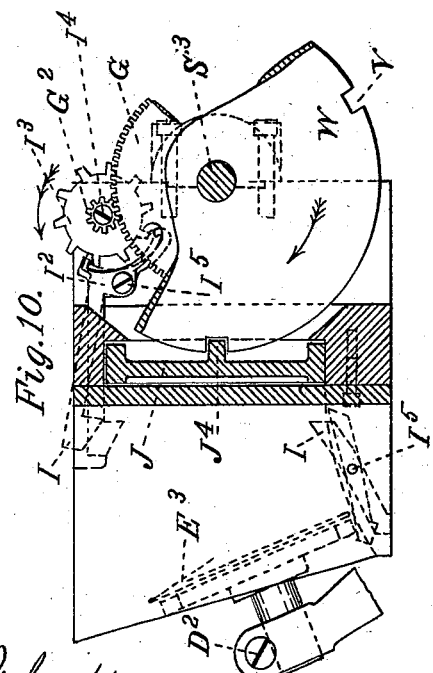
Witnesses;
H. T. Orcutt.
C. O. Palmer.
Inventor;
Francis H. Richards.

(No Model.) 8 Sheets—Sheet 7.
F. H. RICHARDS.
ENVELOPE COUNTING, PACKING, AND BANDING MACHINE.
No. 354,738. Patented Dec. 21, 1886.
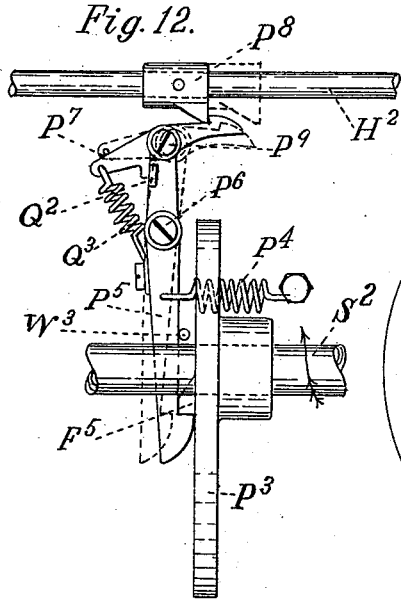
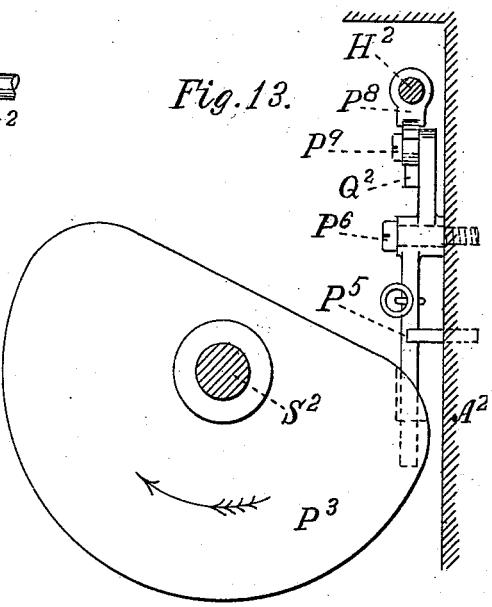
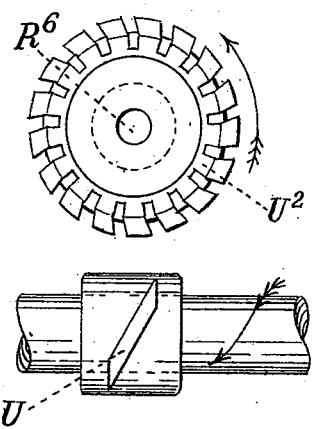
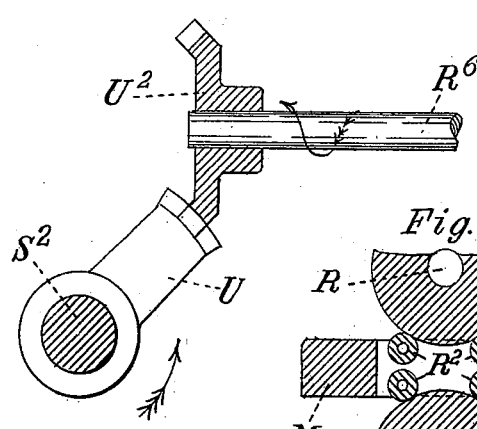
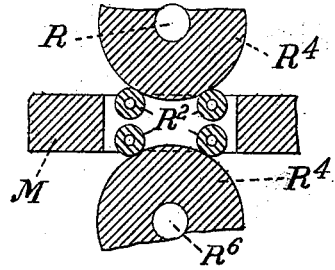
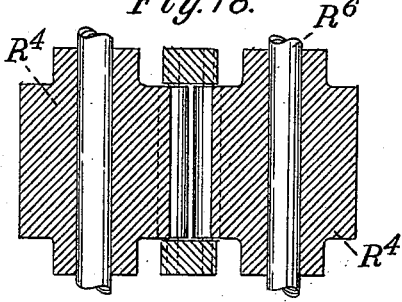
Inventor;
Francis H. Richards,
Witnesses;
C. O. Palmer
H. F. L. Orcutt (No Model.) 8 Sheets—Sheet 8.
F. H. RICHARDS.
ENVELOPE COUNTING, PACKING, AND BANDING MACHINE.
No. 354,738. Patented Dec. 21, 1886.
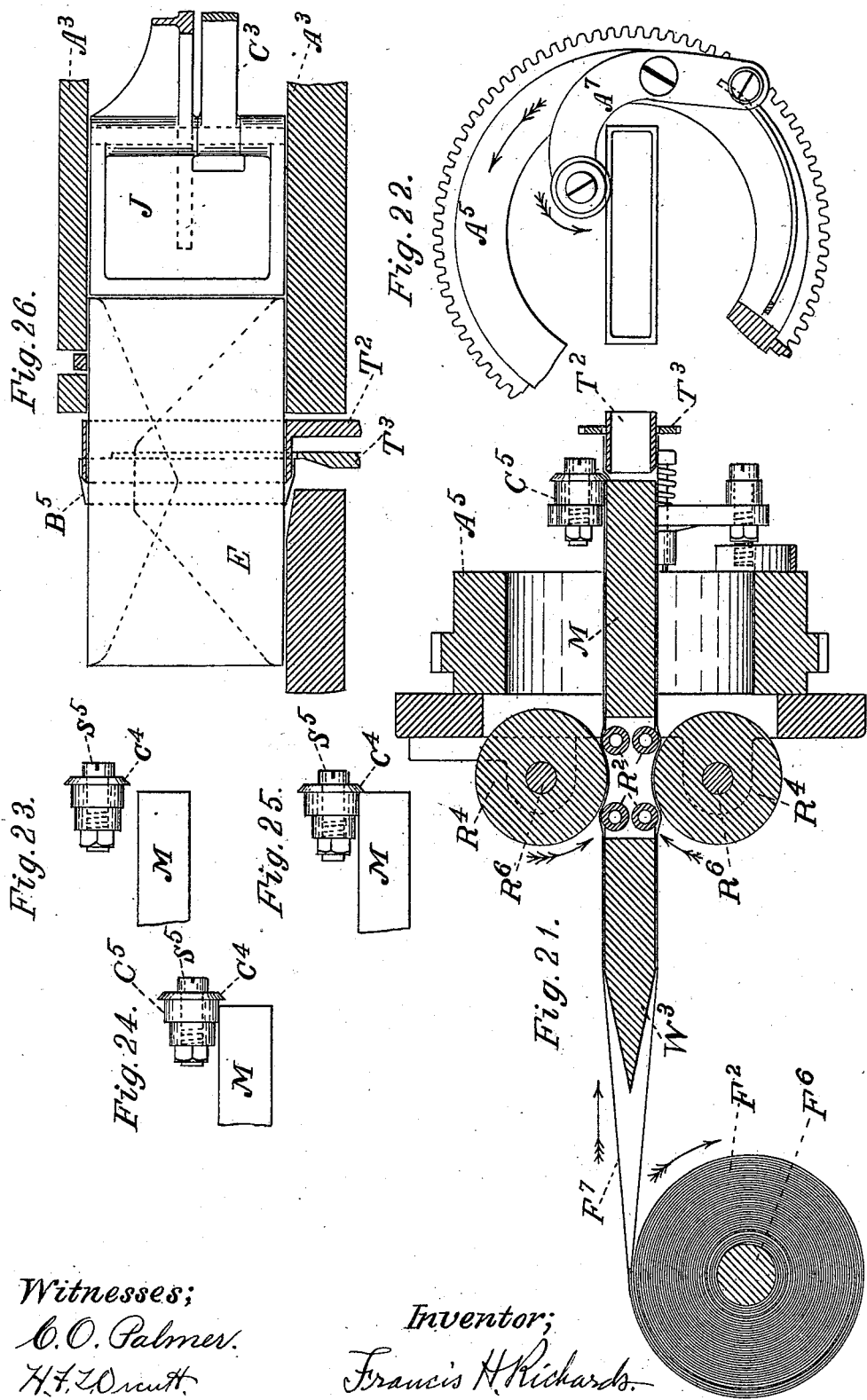
Witnesses:
C. O. Palmer.
H. F. Orcutt.
Inventor:
Francis H. Richards.
N. PETERS, Photo-Lithographer, Washington, D. C.

UNITED STATES PATENT OFFICE.

FRANCIS H. RICHARDS, OF SPRINGFIELD, MASS., ASSIGNOR OF ONE-HALF TO THE PRATT & WHITNEY COMPANY, OF HARTFORD, CONN.

ENVELOPE COUNTING, PACKING, AND BANDING MACHINE.

SPECIFICATION forming part of Letters Patent No. 354,738, dated December 21, 1886.

Application filed January 19, 1885. Renewed March 13, 1886. Serial No. 195,154. (No model.)

*To all whom it may concern:*

Be it known that I, FRANCIS H. RICHARDS, a citizen of the United States, residing at Springfield, in the county of Hampden, State of Massachusetts, have invented certain new and useful Improvements in Machines for Counting, Packing, and Banding Envelopes and Similar Articles, of which the following is a specification, reference being had to the accompanying eight sheets of drawings, forming a part thereof.

This invention relates to machinery for the counting and packing of envelopes, cards, papers and similar articles into bunches of given numbers, and to the banding of the said bunches, the whole constituting an improvement on the mechanism shown in my application, Serial No. 134,480, filed June 10, 1884, to which reference may be had.

It has for its object to furnish mechanism for receiving said articles from printing, folding, or other machines as they are delivered therefrom in the usual manner, and to automatically count, pack into bunches, and band the same, ready for boxing.

It consists in certain improvements and combinations of mechanism, which will first be described, in connection with the drawings, as adapted for counting, packing, and banding envelopes, and afterward pointed out in the claims.

Figure 2:
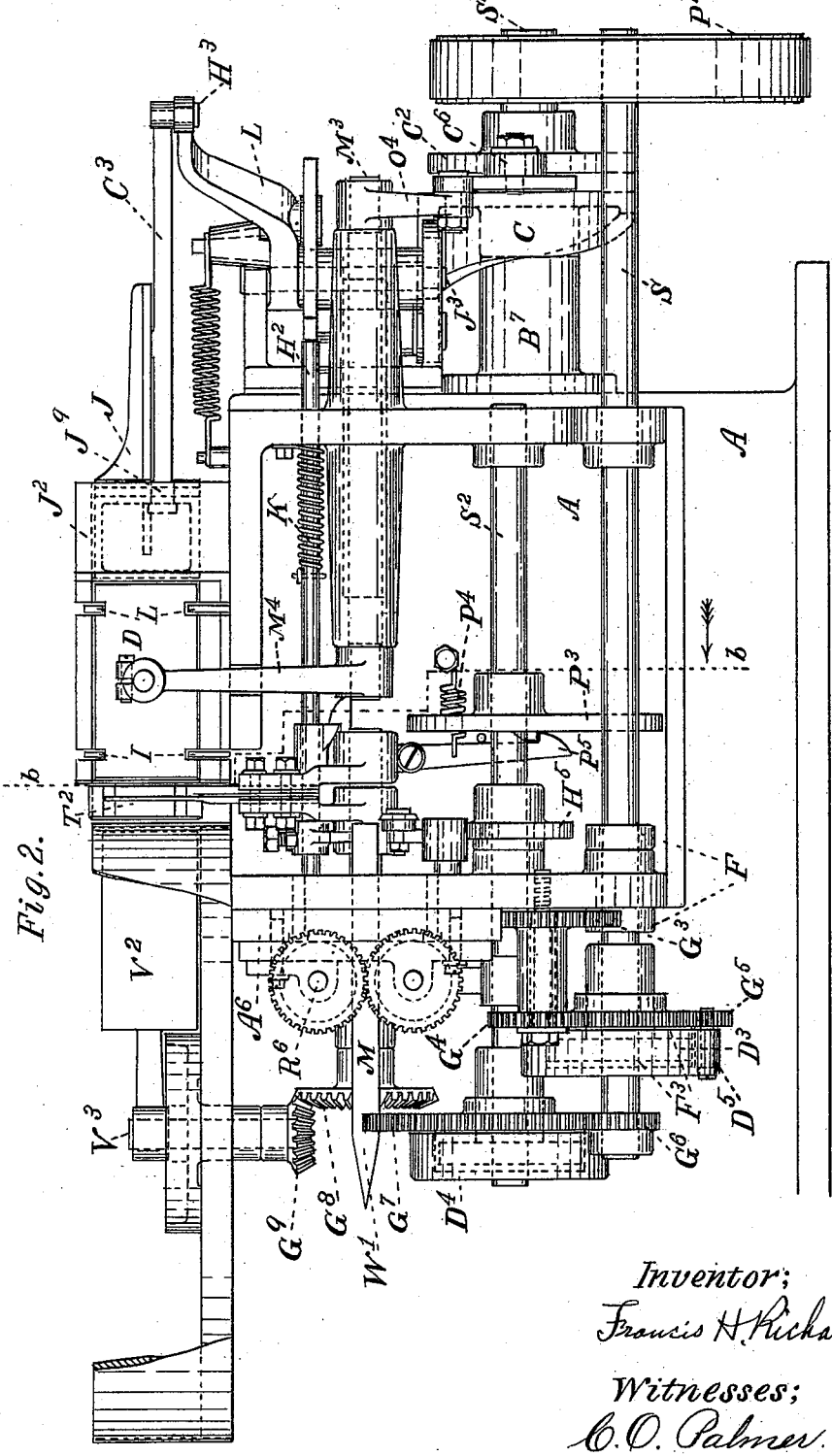
Figures 3, 4:
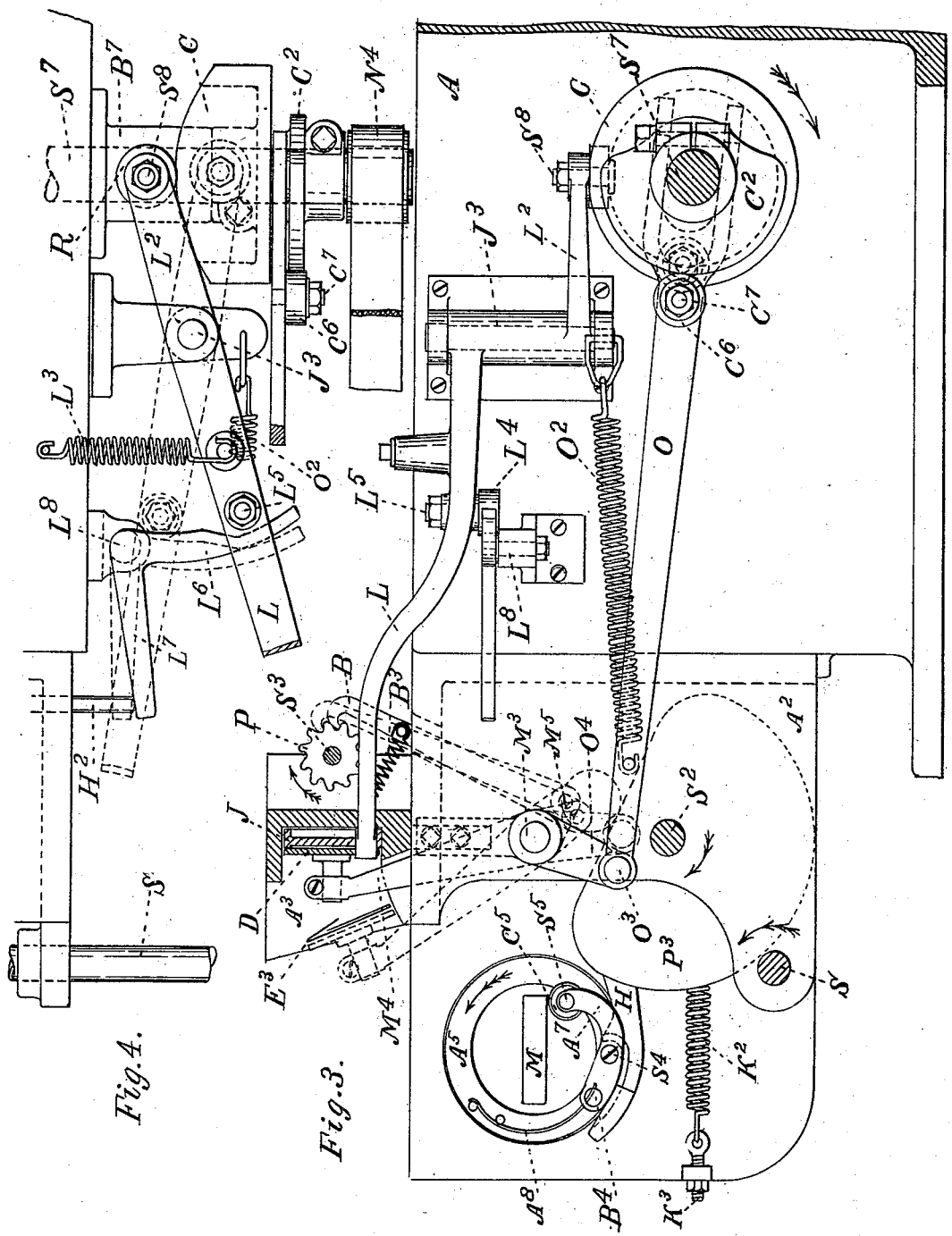
Figure 5:
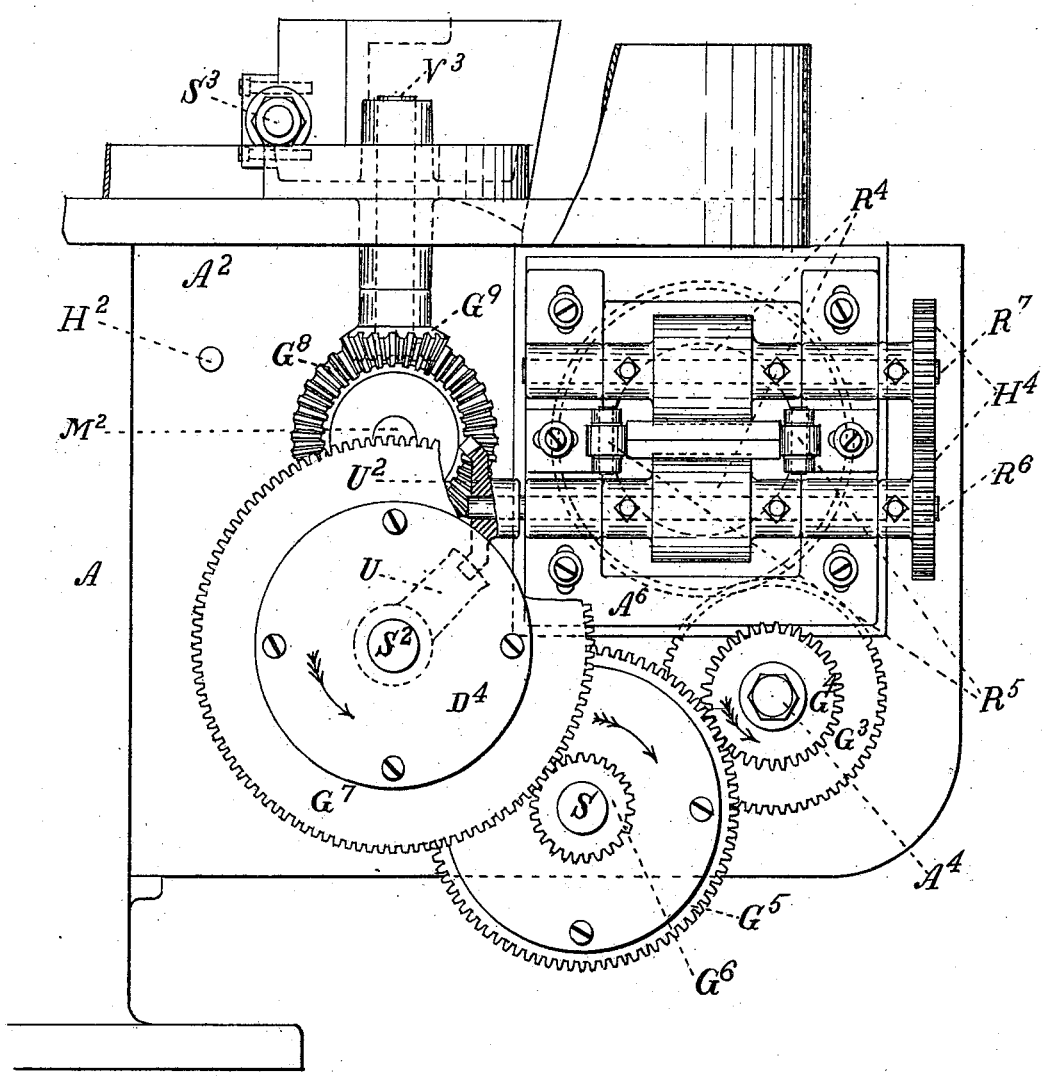
Figure 6:
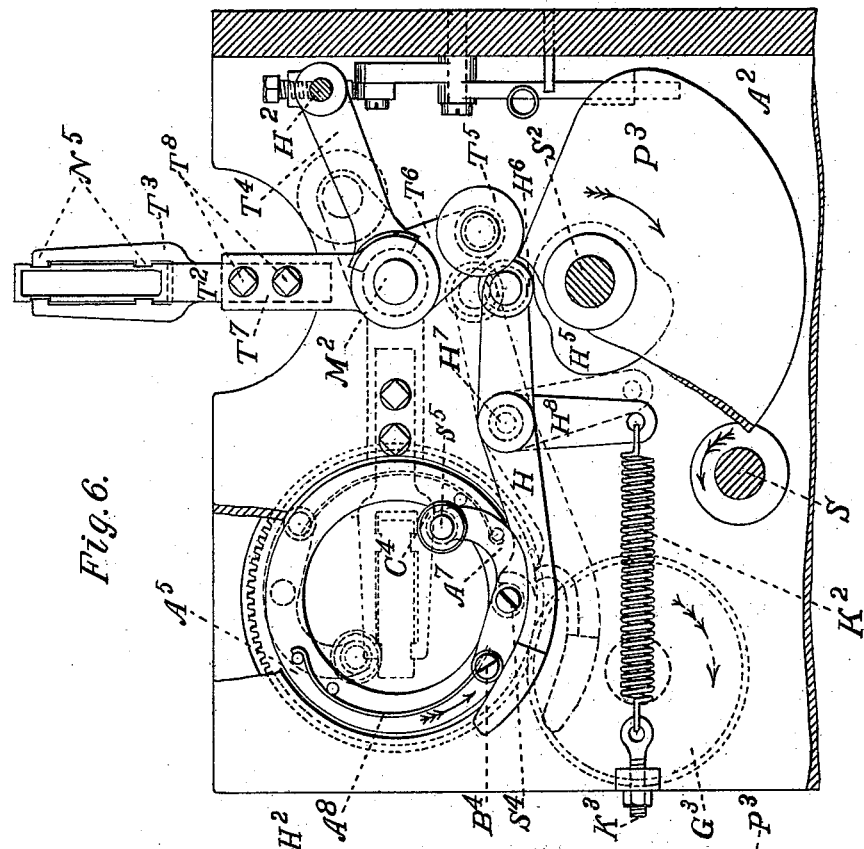
Figure 7:
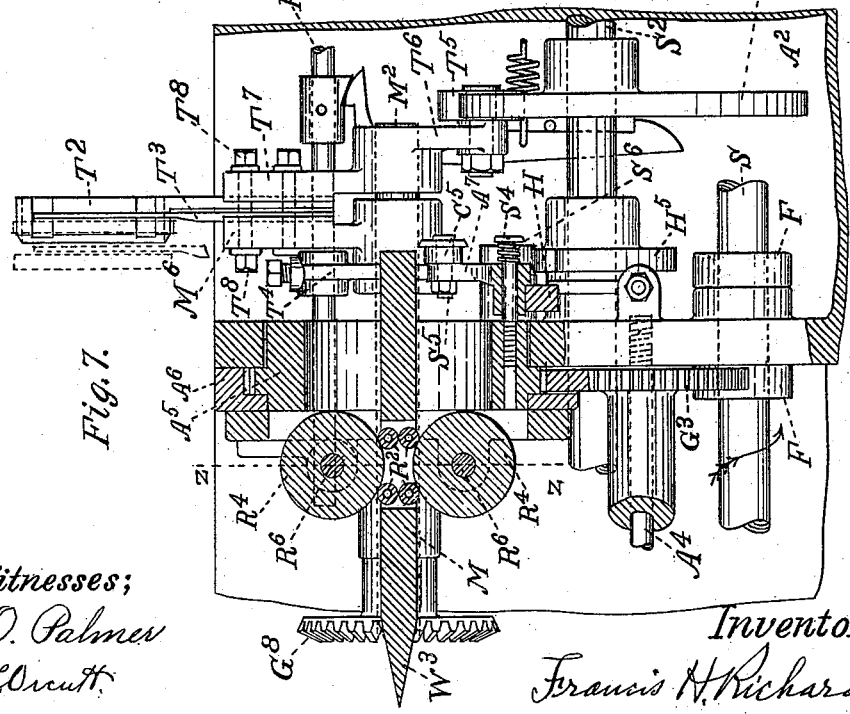

Referring to the drawings, Figure 1 is a plan view of a machine embodying my invention, the main shaft of the envelope-machine to which the same is attached not being shown. Fig. 2 is a front side elevation. Fig. 3 is a right-hand end elevation, partially in section. Fig. 4 is a plan of a part of Fig. 3. Fig. 5 is a left-hand end elevation with certain parts removed. Fig. 6 is a section in line $b\,b$, Fig. 2. Fig. 7 is a front view of the machine, partially in section. Fig. 8 is a top view, partially in section, of the packing-box and counting mechanism. Fig. 9 is a rear side view of this mechanism. Fig. 10 is a section in line $x\,x$, Fig. 8, with certain parts broken away. Fig. 11 is a section of the packing-box in line Y Y, Fig. 9. Fig. 12 is an enlarged front view of the knock-off mechanism shown in Fig. 2. Fig. 13 is an end view of the parts shown in Fig. 12. Fig. 14 is an enlarged view of a part of Fig. 5. Fig. 15 is another view, partially in section, of the parts shown in Fig. 14. Fig. 16 is an enlarged top view of a part of the shuttle M. Fig. 17 is an enlarged vertical section of the same part. Fig. 18 is a vertical section in line Z Z, Fig. 7. Fig. 19 is a top view of a part of lever H. Fig. 20 is a side view of a part of lever H. Fig. 21 is a longitudinal vertical section through the shuttle and roll of paper tubing. Fig. 22 is an end view of the parts shown in Fig. 21. Fig. 23 shows the position of the cutter-roll when at rest. Fig. 24 shows the position just before and after cutting. Fig. 25 shows the position of said cutter when it is cutting. Fig. 26 is a vertical longitudinal section through a part of the packing-box and band-carrier, showing a bunch of envelopes in the operation of banding.

Similar letters refer to similar parts throughout the several views.

The frame $A^2$, which holds most of the machinery, is attached to the bed A of an envelope-folding machine, from which it derives its power. On the top of frame $A^2$ is the packing-box $A^3$, which receives the envelopes one at a time and holds them until the counting mechanism registers the number required for a bunch, when they are pushed along by plunger J through a band-carrier, $T^2$, the band being pushed off by the shifter $T^3$ while the bunch is on its way through said band-carrier, as shown in Fig. 26, thus leaving the band in the middle of the bunch, the bunch, however, continuing uninterruptedly to the position of E. (Shown in dotted lines in Fig. 1.) From this position it is carried by the vibrating arm $V^2$ to the end of the line of piles $E^2$ of the same figure, the band-carrier in the meantime moving to the horizontal position shown in dotted lines in Fig. 6, to receive another band.

Such being the general operation, briefly described, I will now proceed to a detailed description of the construction and operation of the mechanism.

The driving-shaft of the envelope-machine, $S^7$, Fig. 4, carries a cam, $C^2$, which works the packer D, by means of forked rod O, arm O⁴, shaft M³, and arm M⁴. The fork at the end of rod O straddles the shaft S⁷, and is thus kept in position vertically by said shaft. The rod O is provided with roll C⁶, revolving on a stud, C⁷, which is secured to the rod. Roll C⁶ is kept in contact with the cam by means of spring O², connected to rod O, as shown. The opposite end of rod O is connected to arm O⁴ by means of pin O³; and said arm O⁴ is firmly secured to and operates oscillating shaft M³, which shaft has secured to its opposite end the arm M⁴, carrying at its upper end the packing-plate D. This plate is secured in place on said arm by clamping its stem by means of a screw, D². Cam C², aided by spring O², acts to impart a reciprocating motion to rod O, which is thereby communicated through arm O⁴, shaft M³, arm M⁴, to packing-plate D. An envelope, E³, is dropped from the usual endless apron into the position shown by the dotted line in Fig. 10, and pushed by the movement of D into the packing-box A³, as shown in Fig. 11. This packing-box carries the counting mechanism, hereinafter described, and is provided with a plunger, J, whereby the full bunches of envelopes are discharged from said box.

For operating the plunger, the driving-shaft S⁷, Fig. 4, carries a cam, C, which works said plunger by means of the lever L and connecting-rod C³, Fig. 2. The lever L is pivoted at J³, Fig. 3, and carries at one end a roll, R, which moves against cam C, and at the other end is connected by the stud H³ to connecting-rod C³, Fig. 2. The roll R is kept in contact with cam C by spring L³. The lever L has also attached to it a roll, L⁴, pressing against which is the lever-cam L⁶, which cam is made fast to arm L⁷ and oscillates on pivot L⁵. On rod H² is placed a spiral spring, K, which keeps it in contact with arm L⁷, and hence the cam L⁶ in contact with roll L⁴. The shaft S⁷, carrying cam C, rotates in the direction indicated by the arrow, and thus allows lever L to be moved by the spring L³ to the position shown by the dotted lines, Figs. 1 and 4, which lever at the same time moves cam L⁶ to the position also shown in dotted lines in said figures, the arm L⁷ at the same time moving the rod H², for a purpose hereinafter explained. The plunger J, which slides in box A³, is connected to rod C³ by pin J⁹, and is pushed through said box to the position shown by the dotted lines in Fig. 1 by the lever L, acting through said connecting-rod C³, the packing-plate D in the meantime remaining in its inward position until the envelopes are pushed out of the packing-box.

The power for driving the counting mechanism about to be described is obtained from arm M⁴ by means of pawl B, connected thereto at M⁵, which pawl turns the ratchet-wheel P. The counting mechanism is carried by the packing-box A³ as a frame, the construction of which will be readily understood from the drawings. Ratchet-wheel P, having a cylindrical projection or hub on one side thereof, is made hollow to serve as a bearing for shaft S³, Fig. 8. The exterior of said cylinder is clamped by cap J⁸, which is lined with a leather friction-piece to hold the ratchet from turning while the pawl is moving upward. The ends of said ratchet-wheel are clamped between two leather washers, J⁶, through which its motion is communicated to shaft S³. The said washers are held against said ratchet by disks I⁶, the pressure of which is regulated by nut I⁷. On the opposite end of shaft S³ is screwed a collar, N³. A spiral spring, J⁵, is wound around the shaft S³ and one end firmly secured in said collar N³, while the opposite end is fastened to disk W. The nut I⁷ is screwed up until the desired friction is obtained between ratchet P and shaft S³, (which friction, however, must be less than between pawl P and cap J⁸.) If now the disk remains stationary, the turning of pawl P produces a torsional stress in shaft S³, which is transmitted through spring J⁵ to disk W, and is proportional to the friction on washers J⁶. The packing-box A³ is provided with four hooks, I, pivoted at I⁵, of which two are on the lower side and two on the upper side. One of the upper hooks has at its pivoted end a pallet, I², working into the escapement-wheel I³. This escapement-wheel revolves about its center I⁴, and is provided with a pinion, G², which meshes into gear G. Gear G is attached to disk W, which revolves therewith about the shaft S³, on which it is loosely fitted.

The envelope in entering the packing-box from the position shown by the dotted line in Fig. 10 pushes against and separates the hooks I to their position, as shown by the dotted lines in the same figure. The hooks, owing to their construction, are returned by gravity to their former position after the envelope has passed their points, and thus they prevent the envelopes from being pushed outward. The force of spring J⁵ being communicated by disk W through gear G and pinion G² to escapement-wheel I³, revolves said wheel through the distance of one tooth, whenever it is allowed to do so, by the moving of the pallet to its position shown in dotted lines, Fig. 10. Cam C at each revolution pushes plunger J away from disk W, so that the friction of J⁴ against W does not prevent its turning around. The disk W has notches V cut in its periphery, and when one of these arrives opposite the rib J⁴ it allows said rib to pass through, and thereby the plunger J to pass through box A³ to its dotted position in Fig. 1, at the same time pushing the bunch of envelopes before it. The size of gear-wheels G² and G, also the number of notches in disk W, are regulated according to the number of envelopes wanted in the bunch, which is usually twenty-five, as in the present instance. The bunch in passing through band-carrier T² has a band slipped onto it in a manner to be hereinafter explained.

The shaft S⁷ has on its end pulley N⁴, (shown in Fig. 4,) and from this runs a crossed belt to pulley P² on shaft S, which belt transmits power to said shaft S, the longitudinal motion of which is prevented by collars F. Said shaft has firmly secured thereto disk $D^3$, which transmits power through an ordinary friction-box, $D^5$, Fig. 2, having leather disks $F^3$, to gear $G^5$, and thence through gears $G^4$ and $G^3$ to the toothed ring $A^5$, the gears $G^4$ and $G^3$ being secured to the same sleeve and turning on the stud $A^4$. To the ring $A^5$ is fastened stud $S^4$, onto which is loosely fitted the arm $A^7$, having both an oscillating and a sliding movement on said stud. One end of this arm has a stud, $S^5$, and the other end the cam-roll $B^4$. The stud carries a roll, $C^5$, and a circular cutter, $C^4$, which are fixed to each other. Said roll is held laterally against shuttle M by spring $A^8$, acting on arm $A^7$, while spring $S^6$ acts to slide said arm longitudinally on the stud $S^4$, to press said cutter against the end of the shuttle.

Shuttle M, which has a wedge-shaped outer end, and which is provided with small rollers $R^2$, is kept in place by rolls $R^4$ and prevented from lateral movement by rolls $R^5$. A long paper tube of sufficient size to admit of a bunch of envelopes being slipped in endwise is made in a separate machine—such a machine, for instance, as the part of a paper-bag machine, in which the tube is made before being made into bags. The said tube is rolled around the center $F^6$, Fig. 21, about which it is supported, the outer end of which tube $F^7$ passes on at the end $W^3$, and over the entire length of said shuttle onto the band-carrier $T^2$, the distance beyond the end of the shuttle being the required width of the band. The cutting off of said tube will be more fully explained hereinafter.

Shaft S has fastened to its end gear $G^6$, meshing into a gear, $G^7$, which is provided with the friction-box $D^4$, constructed like friction-box $D^5$, for transmitting motion to shaft $S^2$. On this shaft $S^2$, Fig. 12, is placed the spiral blade U, which is preferably a short section of a worm having a very coarse pitch. This blade gears into worm-wheel $U^2$, and advances said worm-wheel one tooth at every revolution of the shaft $S^2$, the advance taking place while the shaft $S^2$ turns through a small part of a revolution. This is an old device and will be readily understood without an elaborate description.

Worm-wheel $U^2$ is fastened to shaft $R^6$, and thus transmits motion through said shaft and gears $H^4$ to shaft $R^7$, the said gears being secured to their respective shafts $R^6$ and $R^7$, which shafts carry rolls $R^4$, fixed thereto. The shuttle M, Fig. 17, is held in position vertically and longitudinally by the pressure of the rolls $R^4$ against rolls $R^2$, with which it is provided, as above mentioned, and the paper tube, in passing over said shuttle, also passes between and is fed by said rolls $R^4$ and $R^2$. The sliding friction between rolls $R^4$ and the paper being greater than the rolling friction between rolls $R^2$ and the paper, plus the friction of rolls $R^2$ on their bearings, said rolls $R^4$ are therefore able to draw the paper over shuttle M, while holding said shuttle firmly in place. Thus the rolls $R^4$ serve to feed the paper along on the shuttle at a speed and through a distance depending on the motion of said rolls.

Shaft $S^2$ carries cam $H^5$, for regulating the time of action of the circular cutter $C^4$ by means of the cam-lever H, which lever swings on stud $H^7$, and has a roll, $H^6$, on one end thereof, whereby it is operated from cam $H^5$. From a point near the middle of H an arm, $H^8$, Fig. 6, extends downward, and to its extremity a spring, $K^2$, is connected to keep roll $H^6$ in contact with cam $H^5$. The tension of said spring is adjusted in the usual manner by means of the nut on bolt $K^3$.

On the outer end of lever H is formed cam $B^7$, Fig. 19, for sliding arm $A^7$ along stud $S^4$, for the purpose of carrying the circular cutter away from the end of shuttle M to a position shown in Fig. 24. Lever H has also another cam, $B^6$, Fig. 20, which presses against roller $B^4$, thus revolving arm $A^7$ slightly about stud $S^4$, and thereby moving the cutter-cylinder $C^5$ off from shuttle M, as shown in Fig. 23, the motion of translation along the stud being the first to take place, so there is no danger of dulling the rolling-cutter, as there might be if the motion of rotation took place first.

To shaft $M^2$ is firmly attached arm $T^6$, which at one end carries roll $T^5$, which rolls in contact with cam $P^3$. On the same hub with arm $T^6$ is another arm, $T^7$, and attached to this arm is the band-carrier $T^2$. Shaft $M^2$ carries another arm, $M^6$, to which is attached the band-shifting arm $T^3$, consisting of a fork-shaped piece, one tine of which passes on each side of said band-shifter carrier, as shown best in Figs. 6 and 7. The band-carrier has two grooves, $N^5$, in each side, in which slide suitable projections on the shifter $T^3$, the object of this construction being to get these four projections against the edge of the envelope-band without giving any opportunity for this to get under them. Fixed to rod $H^2$ is an arm, $T^4$, the outer end of which fits a groove in the hub of the shifter-arm $M^6$, and thus acts to slide said arm longitudinally on said shaft without preventing it from rotating with the band-carrier. Both the band-carrier $T^2$ and shifter $T^3$ are preferably made adjustable on their respective arms, being held in position by screws $T^8$, as shown in Fig. 7. Thus the band-shifter is operated in one direction through rod $H^2$, (which rod receives its motion from the lever-cam $L^6$, hereinbefore described,) being moved in the other direction by spring K on said rod. Fixed to the other end of shaft $M^2$ is a gear, $G^8$, which meshes with gear $G^9$, which is fixed to shaft $V^3$, to the upper end of which there is secured the bunch-carrier $V^2$. The motion of shaft $M^2$ is communicated through gears $G^8$ and $G^9$, and shaft $V^3$, and thus rotates the bunch-carrier through the arc required, delivering the bunches as fast as banded into a trough, $F^4$, for conducting them to a convenient position for boxing. The disengagement of cam P³ allows shaft S² to revolve, and thus motion is communicated to the machinery operated by said shaft, as will be hereinafter explained.

Shaft S² is kept from rotating by lever P⁵, a separate view of which is shown in Figs. 12 and 13. This lever is pivoted at P⁶, and has at its lower end a hook, which engages with another hook, P⁵, Fig. 12, on the side of cam P³. To the upper end of lever P⁵ is pivoted lever P⁷ by means of screw P⁹.

On the right-hand end of lever P⁷ is a hook engaging with stop P⁸, fastened to rod H² and moving with it. Lever P⁷ is prevented from rotating too far on screw P⁹ by means of stop Q² on lever P⁵, and is pressed against this stop by spring Q³. Lever P⁵ is prevented from rotating beyond cam P³ by stop W³ in frame A², against which stop it is pressed by spring P⁴. (See Figs. 12 and 13.) Stop P⁸ when at rest is in the position indicated by the dotted lines, and when rod H² moves to the left hand stop P⁸ presses down the hook of lever P⁷ and passes by it, after which lever P⁷ resumes its original position, as shown by the full lines in Fig. 12. Rod H² now moves to the right to its former position, and stop P⁸ moves hook P⁷, and also lever P⁵, to the position shown in said figure, thus disengaging the hook on cam P³, which cam immediately begins to turn, while the said levers P⁵ and P⁷ are returned by the springs to their first positions, (shown in solid lines in Fig. 12,) ready to stop cam P³ when it shall have completed one revolution. This lever-and-hook mechanism is or may be essentially the same in construction and operation as the ordinary gong-bell pull now in common use, and hence it will be readily understood from the drawings.

The operation of my improvement is as follows: The envelopes having accumulated in the packing-box Q, Fig. 1, until the counter registers the number required for a bunch, one of the slots V in disk W comes in line with rib J⁴, and the plunger pushes the bunch through said box by one continuous movement to the position E, Fig. 1. When in its passage, however, the middle of the pack reaches the band-carrier T², the band on T² is pushed off by the band-shifter T³, which is operated by lever L, communicating its motion through rod H² in the manner before described, and shown in Fig. 26. As the plunger J returns to its original position the rod H² returns with it, and in doing so returns the band-shifter also to its original position. The rod H² in returning also pushes the lever P⁵, Fig. 2, off from the stop on cam P³, and thus sets in motion the mechanism operated or allowed to operate by the revolving of shaft S², which shaft, be it remembered, derives its motion from shaft S through gears G⁶ and G⁷ and friction-box D⁴, as already described, and carries the said cam P³ for operating band-carrier T². The revolving of shaft S² operates the bunch-carrier V² by means of mechanism before described, and rotates it through half a revolution to the position shown by the dotted lines in Fig. 1, at the same time pushing before it the bunch E into line with the bunches E², where it is held on one side by those bunches and on the other by hooks W², similar to hooks I in the packing-box. The band-carrier T² moves simultaneously with the movement of bunch-carrier V² to the position shown in dotted lines in Fig. 6 and the paper tube F⁷ enveloping shuttle M is pushed forward over the carrier T² the width of one band beyond the end of the shuttle by means of the tube feeding mechanism before described. The lever H is now moved by cam H⁵ to the position shown by the dotted lines, Fig. 6, thereby allowing spring A to revolve cutter-arm A⁷ about the stud S⁴ until the cutter-cylinder C⁵ presses the side of the shuttle, as shown in Fig. 24, (the paper only being between them.) Next it allows the toothed ring A⁵, which carries said arm, to rotate, and at the same time the spring S⁶ slides the arm A⁷ on said stud S⁴, so that the rotary cutter C⁴ presses against the end of the shuttle M, as shown in Figs. 21 and 25. The same motion of arm H which allows the cutter C⁴ to fall into the position shown in Fig. 25 also removes the resistance to rotation of ring A⁵, which ring is then revolved by the gearing and friction-box described until the arm A⁷ and said cutter carried thereon have passed around the shuttle nearly two revolutions, thereby cutting off a band from the tube of band material F⁷, and leaving it on the band-carrier T², when cam H⁵ and spring K² return the lever H to its original position, at the same time moving the cutter-roll C⁴ away from the shuttle, as before described, first to the position shown in Fig. 24, and then to the position shown in Fig. 23. This carrier now returns (carrying the band on it) to its vertical position, and at the same time, by means of the gearing described for that purpose, the bunch-carrier V² is revolved through a half-circle to the position shown in solid lines in Fig. 1, (it having previously been in the position shown in dotted lines in said figure.)

I have described this machine as being attached to an envelope-folding-machine bed, A, and deriving its motion from the main shaft S⁷ of the same, which shaft makes one revolution for each envelope folded.

Although I have herein shown my invention as fitted to the bed of one form of envelope-folding machine, it is also applicable to other kinds of machines for the same purpose. The mechanism shown in Fig. 4, consisting of cams C and C², levers L and L⁶, rods O, and pulley N⁴, and their accessory parts, is but one means of communicating motion from shaft S³ to the parts held by frame A², which frame holds the machinery embodying the most essential part of my invention. The bunch-carrier V² is but one way of moving the bunches after they are banded, and is not an essential part of my invention.

In this application I make no claim to the method of banding envelopes carried out by the improved machine hereinbefore described, having described and claimed said method in a separate application, Serial No. 175,824, filed August 31, 1885.

Having thus described my invention, I claim—

1. The combination of a packing-box, a stop-wheel, W, means, substantially as described, for limiting the movements of said wheel to the number of envelopes put into said box, shaft $S^3$, an elastic connection between said shaft and wheel W, and driving mechanism, substantially as described, for driving said shaft $S^3$, substantially as set forth.

2. The combination of a band-carrier, a band-shifter, mechanism, substantially as described, for operating said carrier and shifter, and tube feeding and cutting mechanism for placing a band onto said carrier, substantially as described.

3. The combination of a shuttle, a carrier-ring having shaft $S^4$, a cutter-arm on said shaft having a cutter and roll, substantially as described, a spring to swing said arm on said shaft, and a lever, H, for lifting said cutter from the shuttle and stopping the rotation of said ring, substantially as set forth.

4. The combination, with the carrier-ring and its cutter-arm, of lever H, having cams $B^6$ and $B^7$, substantially as described.

5. In an envelope-banding machine, the combination of shaft $M^2$, an arm fixed on said shaft and provided with band-carrier $T^2$, and an arm which is adapted to slide on said shaft and has a band-shifter, $T^3$, substantially as described.

6. The combination of band-carrier $T^2$, having side grooves, $N^5$, and the band-shifter $T^3$, having projections fitting into said grooves, substantially as described.

7. The combination of a packing-box, devices, substantially as described, for packing envelopes into said box, mechanism, substantially as described, for feeding and cutting off bands, a band carrier and shifter adapted to receive the band from the feeding and cutting-off mechanism and deliver it onto a bunch of envelopes which are passing through said carrier, and means, substantially as described, for putting said bunch out of said box through said carrier, substantially as set forth.

FRANCIS H. RICHARDS.

Witnesses:
H. W. FAULKNER,
R. L. PECK.